(No Model.)

J. DU SHANE.
WRENCH.

No. 331,188. Patented Nov. 24, 1885.

WITNESSES
Phil C. Dieterich
A. E. Dowell

INVENTOR
James Du Shane
by
T. S. Alexander
Attorney ized by you.

UNITED STATES PATENT OFFICE.

JAMES DU SHANE, OF SOUTH BEND, INDIANA.

WRENCH.

SPECIFICATION forming part of Letters Patent No. 331,188, dated November 24, 1885.

Application filed May 26, 1885. Serial No. 166,758. (No model.)

*To all whom it may concern:*

Be it known that I, JAMES DU SHANE, of South Bend, in the county of St. Joseph and State of Indiana, have invented certain new and useful Improvements in Wrenches; and I do hereby declare that the following is a full, clear, and exact description thereof, reference being had to the accompanying drawings, and to the letters of reference marked thereon, which form part of this specification.

Figure 1:
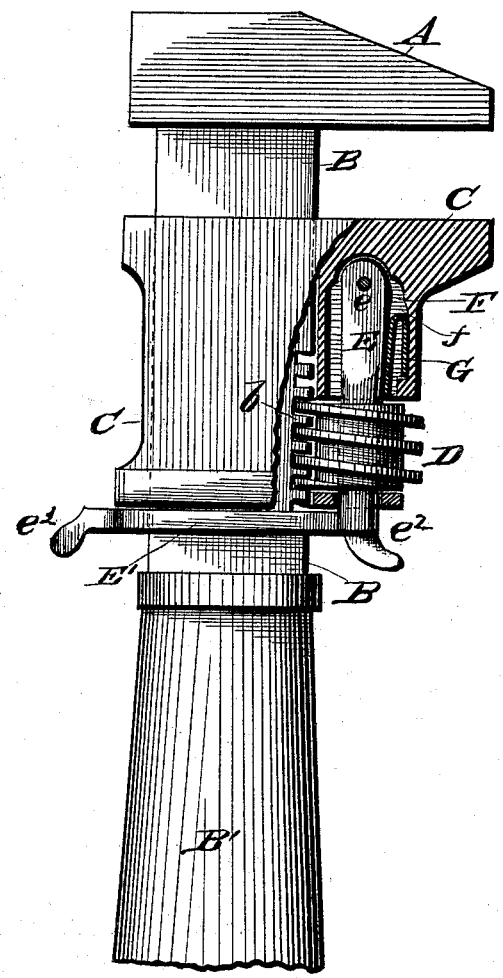
Figure 2:
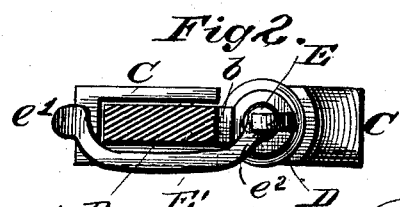

Figure 1 is a view of a modification of my improved wrench, and Fig. 2 is a horizontal sectional detail.

The invention relates to improvements in monkey-wrenches, its object being to construct a simple and cheap rapid-transit wrench, or one in which the jaws may be quickly brought together against an intervening object; and it consists in the construction and novel arrangement of parts herinafter described, and pointed out in the appended claim.

Referring to the accompanying drawings by letter, A designates the stationary jaw of the wrench secured to the shank B, upon the front edge of which is formed the rack $b$.

B' is the handle at the lower end of the shank B.

C is the movable jaw, chambered to slide on the shank B, as usual.

D is the rotating screw, that has its thread adapted to engage the rack $b$, so as to move the jaw C. The screw D is secured to and turns freely on the lower end of a link, E, pivoted at its upper end, at $e$, within a chamber, F, made in the movable jaw C.

$f$ is a recess on the front portion of the chamber F, which recess receives and holds the spring G. The said spring bears against the link E, and forces the screw D and rack $b$ to engage each other.

When it is desired to move the jaw C rapidly, the link is pushed outward against the spring G, so that the screw is released from the rack. The movable jaw can then be slid up or down as fast as desired.

In the modification, the link E, after passing through the screw D, bends at right angles and around the shank B, so as to form the extension E', and has the point $e'$ made on its end and the finger $e^2$ made at its right-angled bend. By pulling on the former with the finger the screw D is released from the rack, and the lower or movable jaw will follow the hand down as the latter is slid along the handle. By shoving the point $e^2$ up with the thumb the screw is also released, and the lower jaw can be shoved upward with one hand. Thus these two points $e'$ $e^2$ enable the workman to use the tool with one hand only.

I am aware that rapid-transit wrenches having racks on their shanks, screws engaging therewith and journaled on a pivoted axis, and springs to force the said screws into engagement have been made, and I do not claim such, broadly; but Having described my invention, I claim—

In a wrench, the combination of the fixed jaw A and shank B, provided on its front edge with the rack $b$, with the movable jaw C, provided with the recess or chamber F, the pivoted link E, having the extension E' at right angles to itself, curving around the shank from front to rear, and provided with the finger-hold $e'$ and point $e^2$ to receive pressure from the thumb, the screw D, rotating on the link, and the leaf-spring G, in a recess, $f$, of the chamber F, and adapted to cause the screw to engage with the rack, substantially as specified.

In testimony that I claim the foregoing as my own I affix my signature in presence of two witnesses.

JAMES DU SHANE.

Witnesses:
 CHAS. W. WILEY,
 WILLIS A. BUGBEE.